United States Patent [19]

Riboulet et al.

[11] 4,204,120
[45] May 20, 1980

[54] PROCESS AND APPARATUS FOR THE MEASUREMENT OF THE FACTOR OF INFRA-RED ABSORPTION OR EMISSION OF MATERIALS

[75] Inventors: Michel J. Riboulet, Calmont; Gèrard R. Sègui, Toulouse, both of France

[73] Assignee: Centre National d'Etudes Spatiales, Paris, France

[21] Appl. No.: 908,021

[22] Filed: May 22, 1978

[30] Foreign Application Priority Data

May 20, 1977 [FR] France ............................... 77 15497

[51] Int. Cl.² ............................................... G01T 1/00
[52] U.S. Cl. ..................................... 250/341; 250/338
[58] Field of Search ............... 250/338, 340, 341, 352, 250/353, 358 R; 73/355 EM

[56] References Cited

U.S. PATENT DOCUMENTS

| | | | |
|---|---|---|---|
| 3,916,690 | 11/1975 | Brandli | 250/341 X |
| 4,134,015 | 1/1979 | Cunningham | 250/341 |

*Primary Examiner*—Davis L. Willis
*Attorney, Agent, or Firm*—Sughrue, Rothwell, Mion, Zinn and Macpeak

[57] ABSTRACT

A method of measuring the absorptivity or emissivity factor of a sample at ambient temperature comprises maintaining a thermopile at a constant temperature substantially above ambient temperature and exposing the sample to radiation exclusively from the thermopile. The voltage across the thermopile is measured and provides a measure of the absorptivity or emissivity factor. The thermopile may be disposed in a temperature-controlled furnace extending into a conical cavity.

10 Claims, 3 Drawing Figures

PROCESS AND APPARATUS FOR THE MEASUREMENT OF THE FACTOR OF INFRA-RED ABSORPTION OR EMISSION OF MATERIALS

The present invention relates to a method of rapidly and reliably measuring the infra-red absorption or emission factor of materials, in particular coatings, and to an apparatus for carrying out the method.

Knowledge of the infra-red absorption or emission factor is indespensable in many terrestrial applications, such as the evaluation of the heat insulation of dwellings, as well as in may spatial applications, such as the passive heat control of satellites in space. However, all the conventional measurements of either of these factors are relatively difficult to perform and time consuming.

The main subject matter of the invention is a method of determining the absorbtion or emission factor starting from an infra-red reflectivity measurement of a sample, characterized in that the sensing element of a thermopile, radiating at a given termperature greater than the ambient temperature, is exposed to the radiation of the sample at the ambient temperature as well as to the infra-red radiation of the thermopile reflected by the sample, and that the output voltage across the thermopile is measured.

Having thus determined, by means of a series of samples whose absorption or emission factors are accurately measured using a calorimetric method under vacuum, the correspondence between the measurements of the voltages across the thermpoile produced for each of these reference samples, and the values of the emission factors of these samples, it is very easy to deduce the emissivity or the absorptivity of any new sample disposed in the well defined infra-red radiation field of the thermopile by simply measuring the value of the voltage across it.

The invention also provides an apparatus for carrying out this method, characterized in that the radiating surface of the sensing element of the thermopile and the reference elements of the thermopile, having been heated to a given temperature, are disposed in the cavity of a furnace, this cavity being at the bottom of a well or shaft with reflecting surfaces to ensure insulation for the radiation exchanged between the thermopile and the sample.

In this way an extremely handy probe is thus obtained since it is sufficient to give the furnace and the side walls surrounding the cavity a configuration capable of resting directly on the sample at the edges of the side wals to be ready to effect the desired measurements.

Furthermore such an arrrangement makes it possible to ensure a well defined distance between the sample and the sensing surface of the thermopile, which assists in obtaining accurate measurements.

Another object of the invention is to further increase accuracy in measurements by providing heat insulation in the probe assembly by incorporating in the heating circuit of the furnace a temperature control means to maintain the thermopile at a sufficiently constant temperature to produce constant infra-red radiation.

This characteristic is the more advantageous in that it makes it possible, once the reference temperature has been attained, to increase the rapidity with which the absorption factor of a plurality of samples can be made. Each measurement can for example be made in a few seconds while the temperature of radiation is automatically maintained constant. Very short measurement times make possible to avoid the influences of conduction and gas conductivity which affect the equilibrium temperature obtained by radiation exchange of the sensing surface of the thermopile. Heating of the air trapped inside the heat-insulating walls and the rise in temperature of the sample owing to the energy absorbed by the sample, cause a slow drift in the measurement at the end of about 30 seconds, i.e. a time interval much longer the the measurement time. Accordingly the new probe thus obtained makes it possible to produce a voltage which is a function of the infra-red absorption factor of the measured surface.

Another object of the invention is to provide an apparatus for measuring and display the thermopile voltage, comprising calibrating means for obtaining direct reading of voltages suitable to be easily translated into absorption factors.

It is then possible, independently of the ambient temperature, which is by construction always lower than the probe temperature, to compare the voltages displayed by the apparatus for two samples whose absorptivity is known with accuracy, one sample having a low absorptivity value and the other a high value, thereby calibrating the apparatus.

Further characteristics and objects of the invention will appear from the following description with reference to the accompanying drawings which illustrated, by way of non-limiting example, an embodiment of the inventon, and in which:

FIG. 3 is a diagrammatic perspective view of the assembly of the apparatus.

Figure 1:
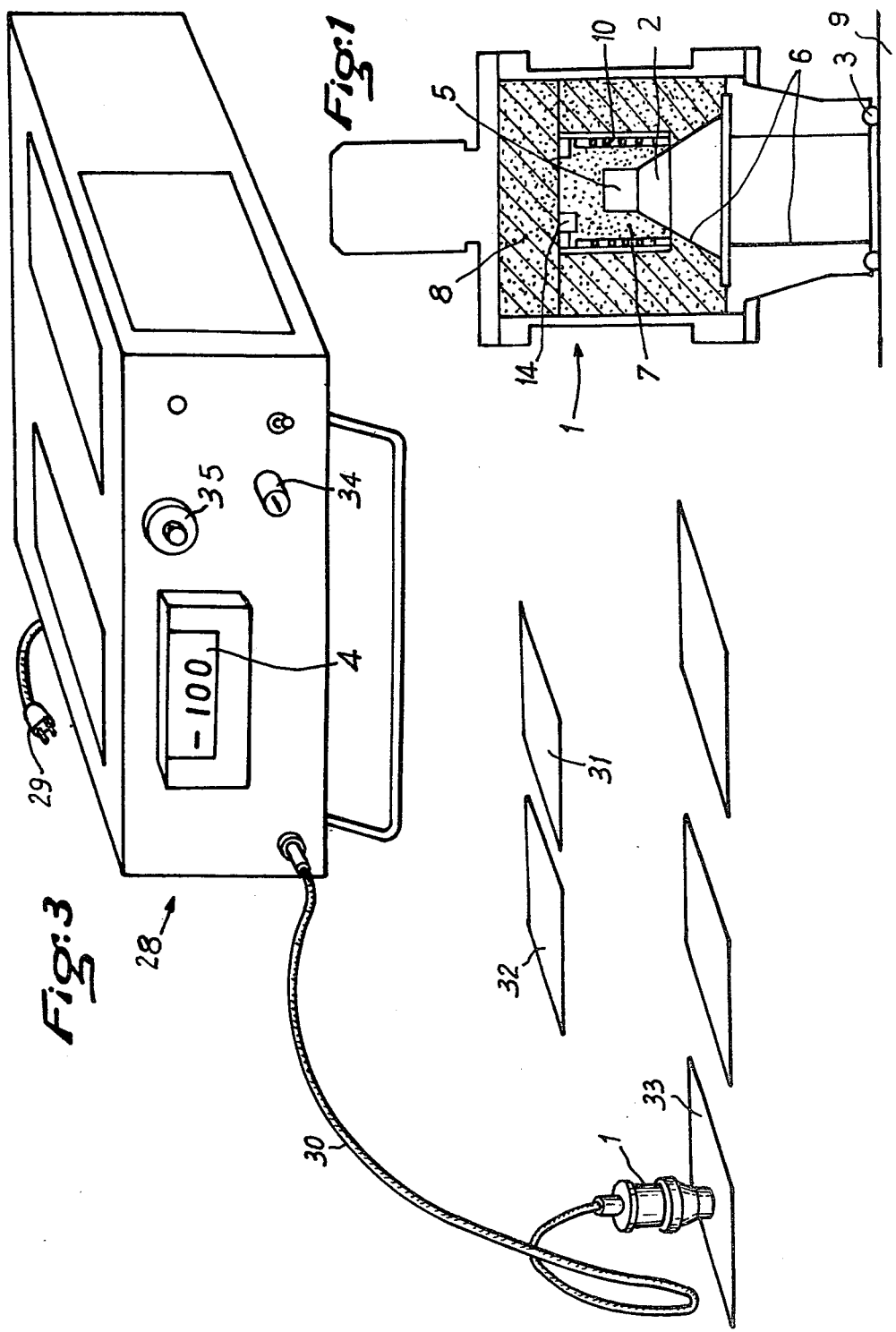
FIG. 1 is a diagrammatic view showing a cross-section of a measuring probe.

The probe 1 essentially comprises a thermopile whose sensing surface has been indicated by 5. This surface radiates at the temperature of a furnace 7 in the cavity 2 whose side walls 6 are polished and gold-plated so as to insulate the thermopile radiation from any other radiation except radiation from samples which have been disposed between an independent support 9 and the end edges of the side walls surrounding the cavity 2 and preferably provided with an elastic member 3. Suitable heat-insulation 8 avoids effects due to ambient temperature variations, and thus it makes it possible to use a sufficiently accurate temperature control circuit to ensure reliability of the probe 1. To this end, the furnace comprises a temperature detector 14 whose signals are used to control the current passing through the heating resistor 10 and designed to heat the thermopile to a predetermined temperature which is preferably chosen between 60° and 80° C., for example 70° C.

Thus, the sensing element 5 of the thermopile, being at a well defined temperature, receives, when the probe 1 is placed on the surface of the sample, on the one hand, infra-red radiation from the sample at ambient temperature and, on the other hand, radiation reflected by the sample and emitted by the thermopile, the radiation from the sample being very low with respect to the reflected radiation. As a result, the temperature variation experienced by the element 5 results in a voltage variation across the thermopile, which makes it possible to rapidly and reliably determine the absorptivity of the sample.

Figure 2:
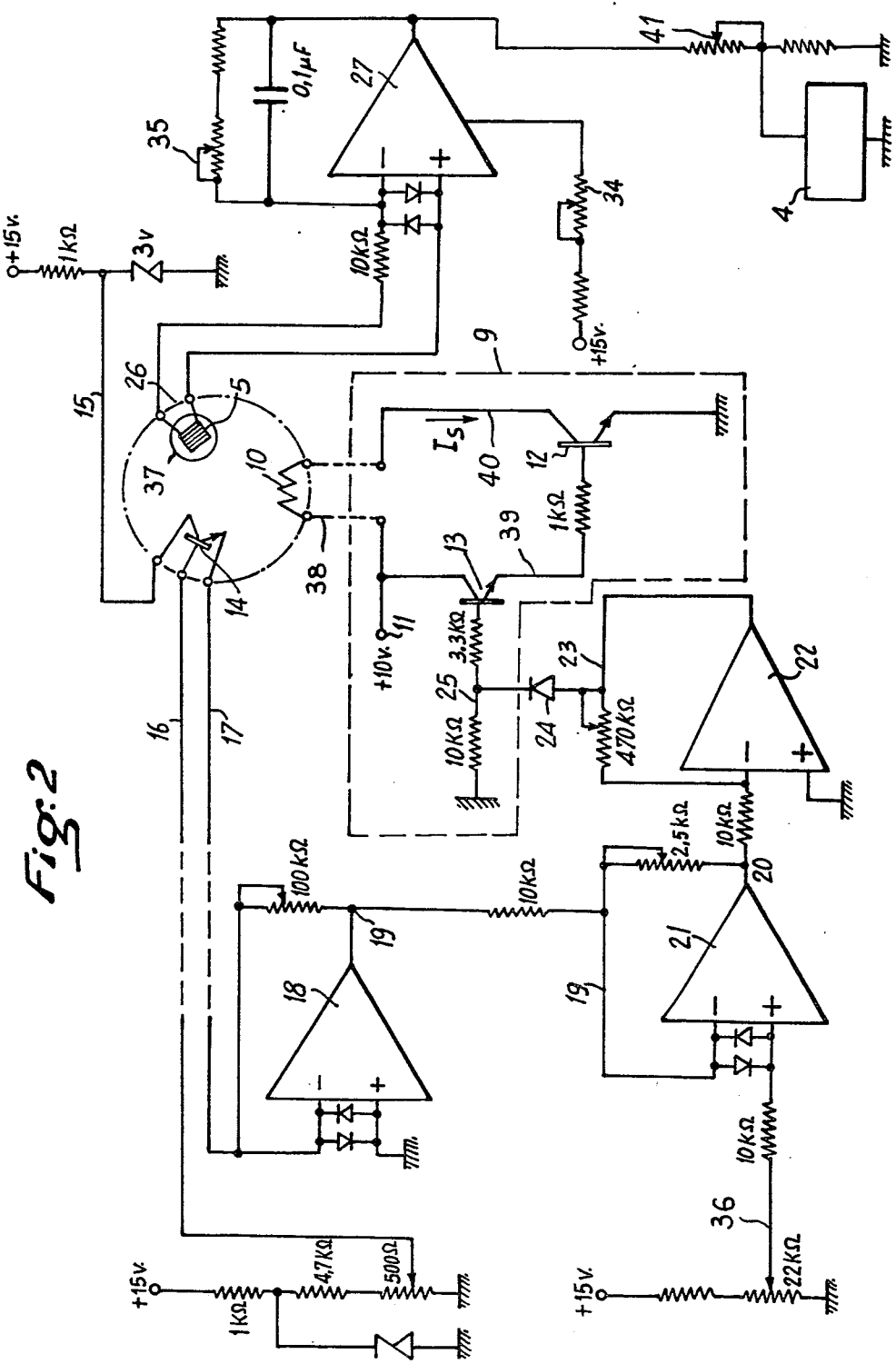
FIG. 2 is a diagram of the electric circuits of the apparatus.

The circuits of the probe are shown in FIG. 2. According to a preferred embodiment of the invention, the detector 14 is a transistor whose output voltage response curve as a function of temperature variations makes it possible to obtain a considerable voltage variation within the range of the temperatures used.

The collector circuit 15 of the transistor 14 is biased at 3 volt and its base is maintained at 500 mV by the circuit 16. In these conditions, temperature variations affecting the detector 14 modulate the current of the emitter circuit 17, this current being amplified by means of an amplifier 18. To make the temperature of the furnace 7 and thus of the thermopile generally indicated by its sensing surface 5, in order to keep the thermopile above the ambient temperature with a difference of the order of 50 degrees, i.e. in the example given above at 70° C. with a tolerance of ±0.1° C., the output signal of the amplifier 18 applied to the output circuit 19 is compared with a reference signal provided by a control circuit 36 of an amplifier 21. To this end, the output circuit 19 of the amplifier 18 is connected to the input of the amplifier 21. The difference signal at the output 20, this signal indicating the termperature variation of the furnace, is amplified by an amplifier 22 whose output 23 is connected by way of a diode 24 to the biasing circuit of the base of a transistor 13 which controls a transistor amplifier 12 connected in series with a heating resistor 10 and controling the current passing through the heating resistor 10 of the furnace 7. To this end, the terminal 11 of a connecting circuit 38 of the heating resistor 10 is connected to the terminal +10 V of a supply at 10 V, 1 A, the circuit 38 being connected to the collector of the transistor 13 whose emitter 39 controls the base of an amplifier 12 connected in series to the resistor 10 by way of the collector circuit 40.

During operation, voltages across the terminals 26 of the thermopile 37 whose sensing surface 5 is shown in FIG. 1, are of the order of millivolt and are due to unbalance effects of infra-red radiation between the sensing surface 5 of the thermopile and the sample. Such voltages are amplified about 200 times by an amplifier 27 controlled by a potentiometer 35. The output of the amplifier 27 is connected by way of the potentiometer 41 to a voltmeter 4 which indicates digital values corresponding to voltage variations in the thermopile 37.

Once the correspondence between voltages supplied by the voltmeter 4 or any other display apparatus 4 and the corresponding values of absorptivity of a multiplicity of samples whose absorptivity values are accurately known, is established, it is sufficient, before using the apparatus indicated by 28 in FIG. 3, to control its calibration by means of two known samples 31 and 32, one of which corresponds for example to the value 0 of the voltmeter and the other to the value 100. Thus, after the cordon 29 has been connected to the current source and the furnace has reached its equilibrium state, it is sufficient to adjust the potentiometer 34 to adjust the value 0 of the voltmeter 4 by measuring the absorptivity of a known sample 31 having a very low absorptivity, and to adjust the potentiometer 35 to reach the value 100 upon measuring the absorptivity of a known sample 32 having a very high absorptivity. Owing to the established correspondence, it is then possible to determine with accuracy and very rapidly the absorptivity of any sample 33 by simply applying the probe 1 to the sample as shown in FIG. 3. The absorptiometer thus obtained is extremely rapid and reliable, the shift effect in measurements due to convection and conduction being negligible.

Of course within the scope of the invention, it is possible to replace any component of the apparatus by equivalent means such as temperature detectors, control circuits for the furnace. Values of some elements have been give by way of indicative examples of orders of magnitude, or even a display apparatus of the values obtained can be used.

In particular, the amplifier 21 and its control circuit 36 effecting comparison of the current of the transistor 14 inside the furnace with a predetermined current indicating the chosen temperature, could be replaced by any equivalent means.

Furthermore, as far as the structure of the probe 1 is concerned and although the conical shape converging towards the sensing element 5 of the thermopile is particularly suitable, it is still within the scope of the invention to adopt any other shape, the cylindrical part could be replaced by any other surface in particular when the axis of the cavity coincides with the median axis of the radiation, the thermopile being disposed in the middle of the furnace.

We claim:

1. A method of measuring the infra-red radiation absorptivity or emissivity factor of a sample which is at ambient temperature, said method comprising the steps of:
   maintaining the temperature of a thermopile constant, except for temperature fluctuations due to the absorptivity or emissivity of the sample, at a value substantially above said ambient temperature;
   exposing said sample to radiation exclusively from said thermopile; and
   measuring the voltage across said thermopile, said measured voltage providing a measure of the absorptivity or emissivity of said sample.

2. A method as set forth in claim 1, wherein said thermopile is maintained at a constant temperature between 60° and 80° C.

3. A method as set forth in claim 2, wherein said thermopile is maintained at a constant temperature of 70° C.

4. An apparatus for measuring the infra-red radiation absorptivity or emissivity of a sample which is at ambient temperature, said apparatus comprising a thermopile, means for maintaining said thermopile at a constant temperature, except for temperature fluctuations due to the absorptivity or emissivity of the sample, which is substantially above said ambient temperature, means for exposing said sample to radiation exclusively from said thermopile, and means for measuring the voltage across said thermopile.

5. An apparatus as forth in claim 4, wherein said means for exposing said sample to radiation exclusively from said thermopile includes a conical wall defining a conical cavity adjoining said thermopile and converging towards said thermopile.

6. An apparatus as set forth in claim 5, wherein said means for maintaining said thermopile at said constant temperature above said ambient temperature comprises a furnace including a heating resistor and heat insulation and defining a cavity at the centre of which said thermopile is disposed, said centre of said cavity being on the axis of the cavity, which axis is the median axis of radiation in said cavity.

7. An apparatus as set forth in claim 6, wherein said furnace further includes a temperature detecting element disposed therein and connected to a current source of said heating resistor so as to control the supply of power thereto.

8. An apparatus as set forth in claim 7, wherein said temperature detecting element is a transistor.

9. An apparatus as set forth in claim 8, wherein there is provided a differential amplifier having one input connected to said transistor, another input connected to a reference circuit for supplying a signal representing said constant temperature, and an output connected to said cuurent source.

10. An apparatus as set forth in claim 4, wherein said means for measuring said voltage across said thermopile includes display means having means for adjusting the value 0 of said display means and means for adjusting the value 100 of said display means, whereby it is sufficient to use two samples of known absorptivity, one said sample being used to calibrate the apparatus at the value 0 and the other said samples being used to calibrate the apparatus at the value 100, to determine by means of a correspondence table the absorptivity value of any given sample.

* * * * *